US012682671B2

(12) United States Patent (10) Patent No.: US 12,682,671 B2
Goldovsky et al. (45) Date of Patent: Jul. 14, 2026

(54) METHOD AND APPARATUS FOR DATASET EVALUATION AND DATABASE MANAGEMENT

(71) Applicant: One Diligence, LLC, Jacksonville, FL (US)

(72) Inventors: Alex Goldovsky, Southampton, PA (US); George Ter-Saakov, Voorhees, NJ (US)

(73) Assignee: One Diligence, LLC, Jacksonville, FL (US)

( * ) Notice: Subject to any disclaimer, the term of this patent is extended or adjusted under 35 U.S.C. 154(b) by 189 days.

(21) Appl. No.: 18/746,371

(22) Filed: Jun. 18, 2024

(65) Prior Publication Data

US 2025/0384707 A1 Dec. 18, 2025

(51) Int. Cl.
*G06V 30/19* (2022.01)
*G06V 30/12* (2022.01)
*G06V 30/412* (2022.01)
*G06V 30/42* (2022.01)

(52) U.S. Cl.
CPC ...... *G06V 30/19133* (2022.01); *G06V 30/127* (2022.01); *G06V 30/412* (2022.01); *G06V 30/42* (2022.01)

(58) Field of Classification Search
CPC ........... G06V 30/19133; G06V 30/127; G06V 30/412; G06V 30/42
See application file for complete search history.

(56) References Cited

U.S. PATENT DOCUMENTS

| | | | |
|---|---|---|---|
| 11,769,341 B2 | 9/2023 | Seth et al. | |
| 11,809,454 B2 | 11/2023 | Yuan et al. | |
| 11,921,696 B1 | 3/2024 | Vigneau et al. | |
| 2018/0067957 A1* | 3/2018 | Paterson | G06F 40/114 |
| 2021/0082062 A1* | 3/2021 | Hurd | G06Q 40/123 |
| 2023/0034344 A1* | 2/2023 | Jain | G06N 3/04 |
| 2024/0290124 A1* | 8/2024 | Obright | G06V 30/413 |
| 2024/0331423 A1* | 10/2024 | Zeng | G06V 30/413 |
| 2024/0355136 A1* | 10/2024 | Vanapalli Venkata | G06V 30/19147 |
| 2025/0124733 A1* | 4/2025 | Sathi | G06V 30/412 |
| 2025/0157242 A1* | 5/2025 | Ramaswamy | G06V 30/412 |

* cited by examiner

*Primary Examiner* — John B Strege

(57) ABSTRACT

A data uploader uploads a first plurality of data values associated with a transaction. A document uploader uploads digital images of a plurality of documents associated with the transaction, wherein a second plurality of data values are embedded in the documents. The digital images are stripped of numerical (or other) data values before being transmitted to a first machine learning engine to identify documents associated with the digital images. A second machine learning engine identifies categories of numerical data values (and other data values) that are included in the second plurality of data values and that are embedded in the documents. The first and second plurality of data values can be compared for accuracy and corrected. The first and second machine learning engine are sent bifurcated feedback regarding the respective identification performed by each to improve future accuracy.

20 Claims, 9 Drawing Sheets

Collect all documents — 150

Enter received documents into tracking system — 152

Verify Completeness of documents — 154

Check for accuracy — 156

Search public records — 158

Review Search results — 160

Resolve Legal Issues — 162

Prepare Commitment — 164

Resolve Outstanding Conditions — 166

Final Review — 168

Approve — 170

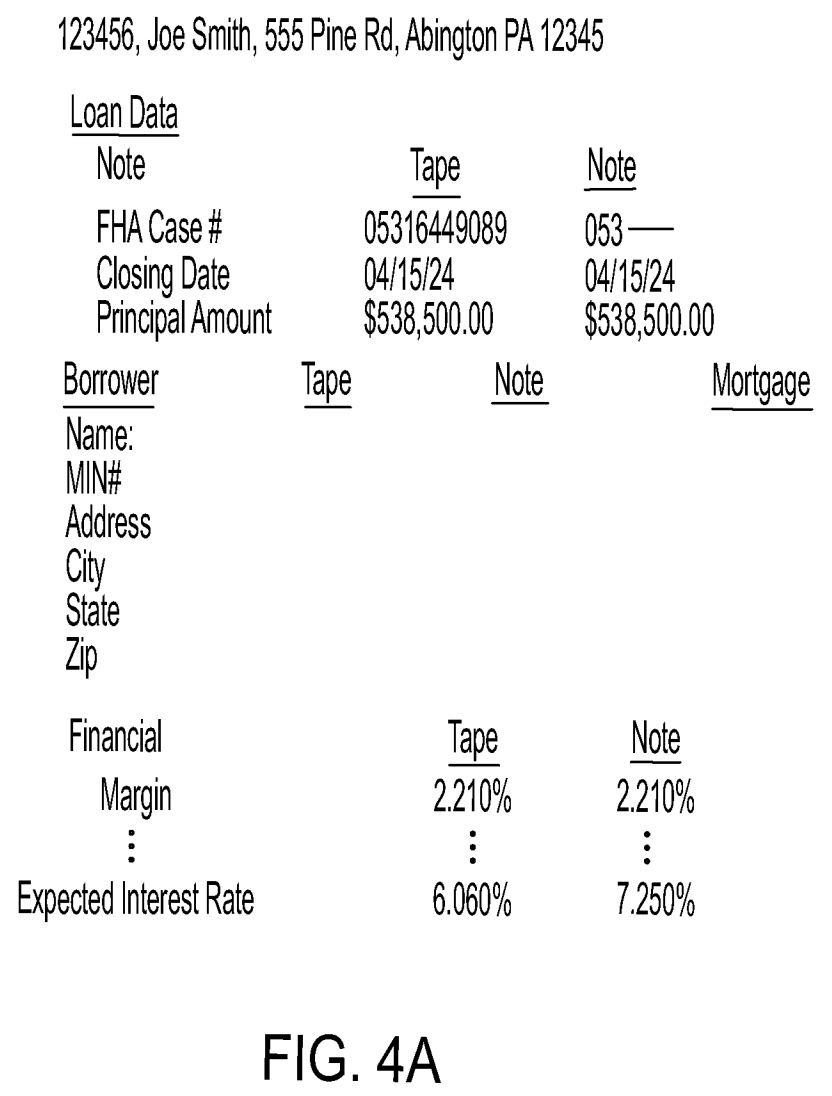

123456, Joe Smith, 555 Pine Rd, Abington PA 12345

Loan Data

|  | Tape | Note |  |
|---|---|---|---|
| Note |  |  | Mortgage |
| FHA Case # | 05316449089 | 053 — |  |
| Closing Date | 04/15/24 | 04/15/24 |  |
| Principal Amount | $538,500.00 | $538,500.00 |  |

Borrower          Tape          Note

Name:
MIN#
Address
City
State
Zip

Financial          Tape          Note

Margin          2.210%          2.210%
...          ...          ...

Expected Interest Rate          6.060%          7.250%

FIG. 4A

⊟ ALLONGE, page 11-12, probability 99.73% allonge_fha_case_no: 053-1644908-962 allonge_note_amount : 538500.00

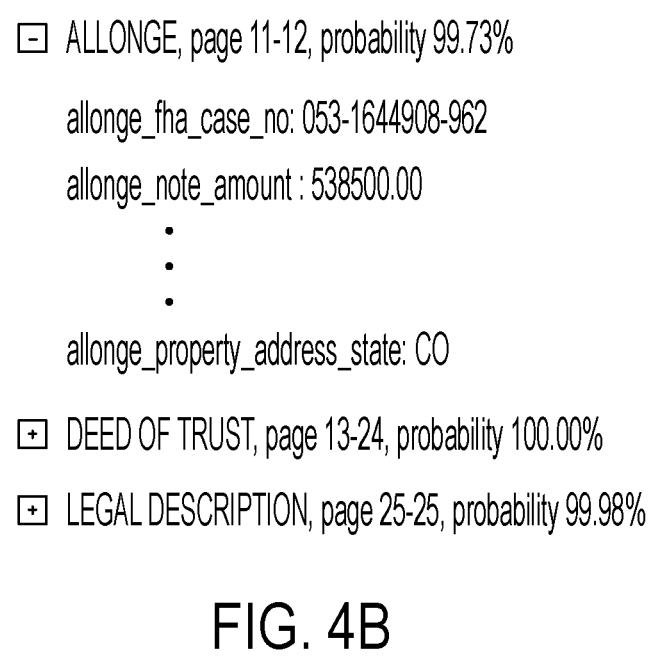

·
           ·
           · allonge_property_address_state: CO

⊞ DEED OF TRUST, page 13-24, probability 100.00%

⊞ LEGAL DESCRIPTION, page 25-25, probability 99.98%

FIG. 4B

| id | | | id | |
|---|---|---|---|---|
| 0 | Unknown | DONE | 263 | Verified |
| 1 | Note_Reverse | DONE | 264 | Verified |
| 2 | TPOL Schedule | DONE | 265 | Verified |
| 3 | 1003 URLA-Application | DONE | 266 | Verified |
| 4 | 1004 Appraisal | DONE | 267 | Verified |
| ⋮ | ⋮ | ⋮ | ⋮ | |
| 20 | Home Ownership Counseling Disclosure | DONE | 282 | Verified |

Document

FIG. 4C

METHOD AND APPARATUS FOR DATASET EVALUATION AND DATABASE MANAGEMENT

FIELD OF THE INVENTION

The present invention relates to evaluation of multiple datasets to enable accurate database storage. In particular, a method and apparatus are disclosed for evaluating data embedded in multiple data sources, performing correct management of the evaluated data, and engaging in multiple processes for improving management accuracy.

BACKGROUND OF THE INVENTION

In the process of reviewing content received from various forms of data sources (objects), it is desirable to evaluate the content and extract the data embedded therein. As embedded data is extracted, the extracted data is desirably subjected to various levels of evaluation. Examples of evaluation include, for example, having a human verify extracted data as well as whether the extracted data has been correctly stored in a database. Such evaluation may be done, for example, using computer systems such as Optical Character Recognition (OCR), which is well known in the art. An example of reviewing an extracted value is a human reviewing form input, where the input has been stored in a data structure. Such evaluation may be done, for example, using computer systems such as webforms in which a user is prompted to enter data into predefined fields. The entered data is then received in the predefined fields, and is subsequently transferred to further allocated locations for further software processing.

An example of the above is a payment processing system in which an image of an image PDF is manually compared with database entries.

Such processes as described in the above examples may include strict adherence to data source protocols, as well as manual steps. Such processes can be subject to inaccurate data entry, and the necessity to comply with pre-established protocols.

One way to improve these processes is by establishing templates in which data is embedded. While the use of templates may in some situations improve accuracy, both during data acquisition and data identification, requirements for adherence to template protocols may be very strict, and the possibility of erroneous evaluation still exists. Furthermore, data extraction processes can be inefficient, and correcting errors can not only be time consuming, but in some situations, errors may not even be detected.

Also, while data evaluation processes may be acceptable on a small scale, and the quantity of data sources increase, the ability to evaluate the increased quantity becomes more onerous. Furthermore, a plurality of data objects may be associated with each one of respectively different transactions. This may result in a further increase in the sheer quantity of data that requires evaluation, thus further complicating the task of ensuring accurate retrieval and subsequent processing of embedded data.

FIG. 1 is a flow chart diagram that illustrates exemplary review of data from multiple data objects in accordance with the prior art. In this example, the multiple data objects are multiple documents, respectively. Also, in this example, the multiple data objects are associated with a financial transaction.

At step 150, documents associated with the financial transaction are collected. At step 152, each received document is entered into a tracking system. At step 154, the completeness of each received document is verified. At step 156, documents are checked for accuracy. At optional step 158, public records are searched to confirm the details of the financial transaction are correctly included in the documents and the financial transaction is eligible for approval. At optional step 160, search results are reviewed with the intention of being approved. At optional step 162, relevant legal issues are resolved. At step 164, commitment to approve the financial transaction is prepared. At step 166, outstanding issues are resolved. At step 168, final review occurs. At step 170, the financial transaction is approved.

While steps in the above financial transaction have been automated, scaling such an operation and confirming accuracy of document content can be time consuming, inefficient, and difficult to achieve.

SUMMARY OF THE INVENTION

A system for processing a plurality of documents associated with a transaction, comprises a data uploader for uploading a first plurality of data values associated with said transaction;

a document uploader for uploading digital images of a plurality of documents associated with said transaction, wherein said plurality of documents include a second plurality of data values embedded therein; a converted digital image handler for providing modified content of said digital images in which said second plurality of data values that are numerical digit values and that were embedded in said plurality of documents are omitted; a document recognition interface 300 for providing access to said modified content, and responsive to said access, receiving from a first machine learning engine, document identification of said plurality of documents;

a data recognition interface for providing access to said digital images with said second plurality of data values to a second machine learning engine, and after providing said access, receiving from said second machine learning engine, extraction of said second plurality of data values from said digital images along with category identification of respective document categories for each of said second plurality of data values that are extracted from said digital images;

a first user interface for enabling comparison and confirming accuracy of said first plurality of data values and said second plurality of data values by displaying said first plurality of data values with said second plurality of data values as being associated with each other, respectively, based on said category identification, and enabling correction if based on said displaying, association between any of said first plurality of data values and said second plurality of data values is missing or incorrect;

a document identification engine training interface for providing feedback regarding correctness of said document identification based on said displaying to said first machine learning engine, for retraining said first machine learning engine to increase accuracy of said document identification of said documents; and a numerical digit identification interface for providing feedback regarding correctness of extraction of said second plurality of data values from said digital images or said category identification to said second machine learning engine for retraining said second machine learning engine to increase accuracy of said extraction or said category identification.

BRIEF DESCRIPTION OF THE DRAWING

FIG. 4A, FIG. 4B and FIG. 4C are simulated screenshots of user interface displays in accordance with exemplary embodiments of the present invention.

DETAILED DESCRIPTION

Figure 1:
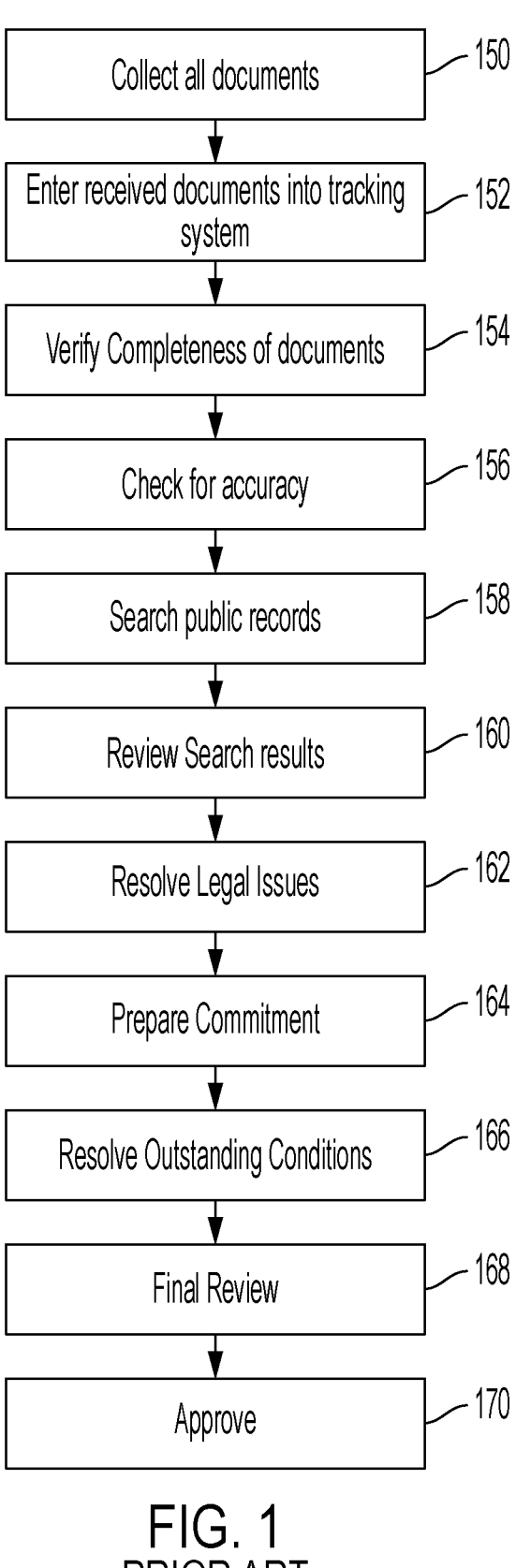
FIG. 1 is a flow chart diagram that illustrates an exemplary review of data objects that are documents in accordance with the prior art.

While the extraction, processing and verification of large data sets obtained from data objects can be onerous, time consuming and inaccurate, an exemplary system and method thereof enables data sets to be verified with greater efficiency and higher accuracy. As explained below, artificial intelligence can be applied to improve this process. As also explained below, the use of artificial intelligence can be bifurcated to achieve technical improvement of the processing of data objects. By designing the system and method to perform the extraction and identification using a bifurcated model, not only is accuracy improved, but utilization of computer resources is achieved with greater efficiency, and accuracy improvement becomes dynamic (and is not merely static compared to the prior art).

An example of a data set that desirably receives processing in accordance with an exemplary embodiment of the present invention is a data set obtained from documents associated with a financial transaction. Financial transactions are in multiple forms, including retail transactions, manufacturing transactions, real estate transactions, monetary transactions, etc. Such transactions may include transactions relating to inventory, transactions relating to property transfers, transactions relating to merely financial transfer (e.g. loans), etc. An example of a transaction relating to property transfers is a title transfer (which may be accompanied by the procurement of title insurance).

In each of the exemplary transactions set forth above, a data set comprises data included (i.e. embedded) in a plurality of documents associated with the transaction. Exemplary documents include legal agreement(s), financial statements, purchase agreements (e.g. purchase orders), freeform aggregations of financial data related to the transaction, predefined formatted aggregations of financial data related to the transaction, etc. In such documents there may be different levels of predefined formatting. The predefined formatting may be highly structured (i.e. the predefined use of specific rows and columns in an excel spreadsheet), or minimally structured (i.e. the relative placement of data relative to other data in a non-formatted image of a document).

In an exemplary embodiment of the present invention, a data set may exist as a first data group and as a second data group. The data in the first data group has already been entered into pre-established data fields. The data in the second group is embedded in a plurality of data objects, such as a plurality of respective documents. The data in the second group is extracted from the plurality of data objects (e.g. documents) and is then compared with the data in the first group for accuracy. If the data in the first data group corresponds (i.e. equals, matches, can be derived from, etc.) with the data in the second data group, then the data in the first data group was entered into the pre-established data fields correctly, and the data in the second data group was extracted from the plurality of data objects correctly. If correspondence is not detected between the respective first data group data and second data group data, then the data in the first data group and/or second data group is desirably corrected in the form of editing, entering, questioning, flagging, etc.

In an exemplary embodiment of the present invention, the aforementioned evaluation is performed as a bifurcated process using artificial intelligence such as machine learning (NLM). The bifurcated process includes a first subprocess whereby data sources such as documents are recognized in order to facilitate data extraction. The bifurcated process also includes a second subprocess whereby the data embedded in the data objects is extracted from the data objects. Technical innovation is achieved by bifurcating the process, wherein training of each subprocess occurs separately. Such bifurcation enables training to occur that is particular to the type of evaluation being performed. As a result of such targeted training, training occurs faster than the prior art and accuracy is improved at a better rate than if such bifurcation does not occur. As the speed and accuracy are improved, the task of comparing the two data groups is performed with greater efficiency and manual correction occurs with lesser frequency. In this manner, resource utilization is improved.

Bifurcation thus provides better resource efficiency and utilization than if bifurcation of model training did not occur.

In an exemplary embodiment of the present invention, before the first subprocess is performed, an additional level of processing may be performed on the first data group. Performing this additional level of processing also achieves technical advantage, by reducing "noise" before the evaluation associated with the first subprocess is performed, thus obtaining more accurate results. In this manner, higher throughput is achieved with greater accuracy. This additional level of processing entails removing content from data objects before the data objects (e.g. documents) are used as part of the first subprocess. This additional level of processing is further described below.

Figure 2A:
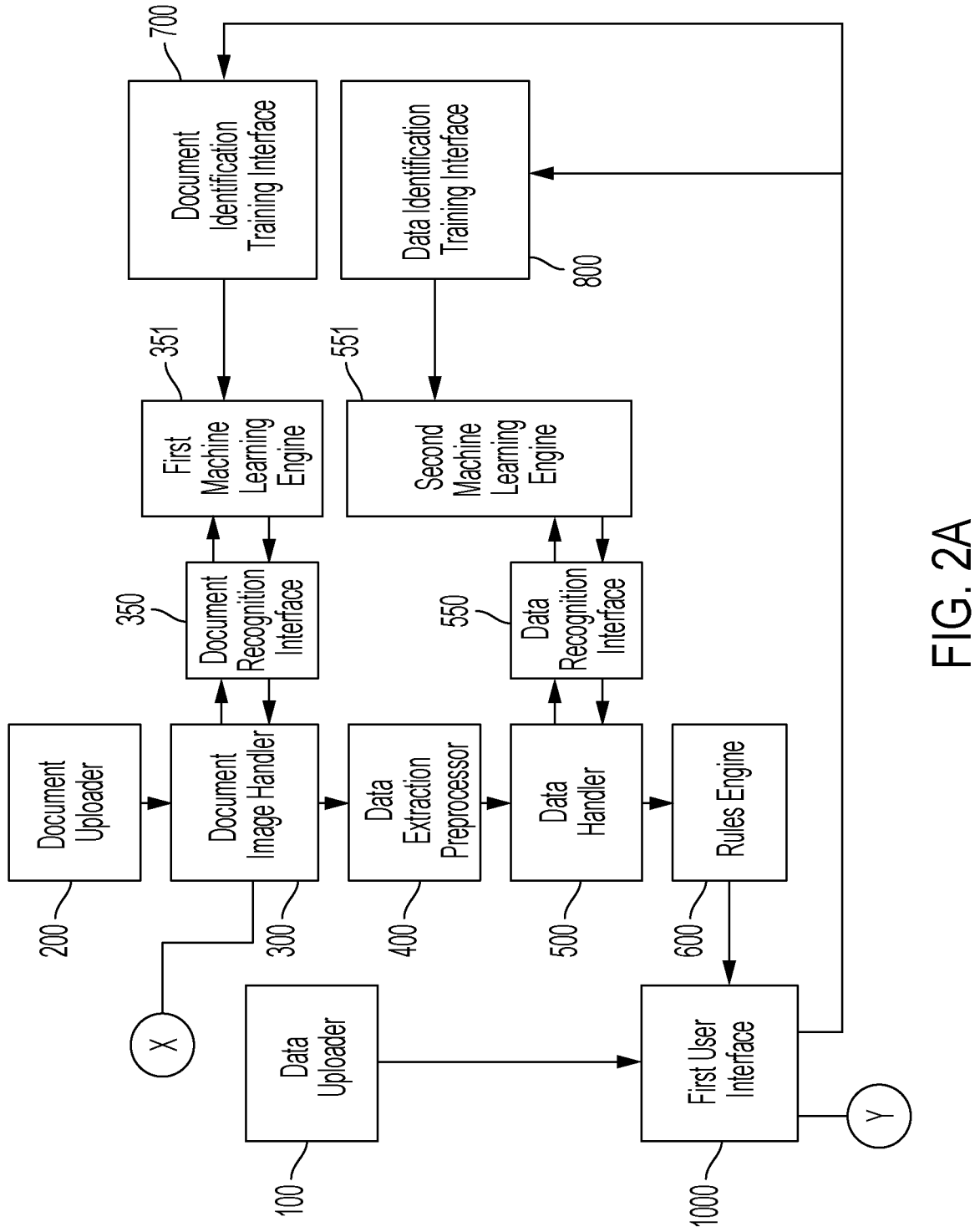
FIG. 2A and FIG. 2B are respective parts of a block diagram that illustrate a system for reviewing data objects that are documents in accordance with an exemplary embodiment of the present invention.
Figure 2B:
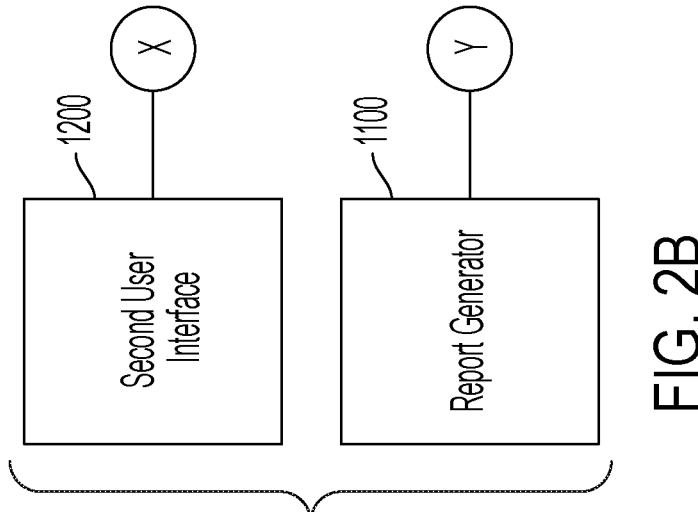

An exemplary embodiment of the present invention is illustrated with the block diagram that appears in FIG. 2A and FIG. 2B. Data uploader 100 receives the data in the first data group. In the first data group, a first plurality of data values are included and have been identified as existing in respective data fields. Each respective data field has a respective category identification (e.g. a particular interest rate, a particular monetary amount, etc.) and the first plurality of data values are received with the respective category identifications. Data in the first data group may have been received from several different sources, including manual entry. During manual entry, assignment to respective data fields may have occurred manually, or it may have occurred through an automated process. For example, a predefined form may have been used to receive the data, and the data may be assigned to respective data fields depending upon where it was inserted into the predefined form. In another example embodiment, prompting may have been used to request entry of the data, wherein entered data is assigned to data fields depending upon which prompt is responded to. Other forms and formats of data entry may be used as would be understood to one of ordinary skill in the art.

Data uploader 100 may also permit selection of a template to be used in organizing and formatting the received data. In one exemplary embodiment, the template is chosen (for example) from a menu. In another exemplary embodiment, an auto-detection process is used to scan the received data and determine the template that corresponds to the data as it was received. The template may be used to format data in a user interface as will be further described below.

Data uploader 100 may also permit selection of one or more rules to be used in organizing and formatting the received data. In one exemplary embodiment, the one or more rules are chosen (for example) from a menu. In another exemplary embodiment, a process is invoked to apply one or more rules based on the template that is used in combination with the received data.

Data uploader 100 may also include a user interface (e.g. web portal) for permitting the selections that are set forth above. The selections may be accomplished via a file "browse," a "drag and drop" interface, a menu driven interface, etc. Alternatively, files may be uploaded via API, SFTP, etc.

Data uploader 100 may also include a user interface for selecting and initiating upload of data objects (i.e. documents associated with a financial transaction). In the event there are multiple versions of a document, the user interface may allow the multiple versions of the document to be uploaded.

Document uploader 200 receives a second plurality of data values in the second data group that are embedded in data objects such as documents. The data may be embedded in a plurality of documents that are uploaded using the user interface included with data uploader 100. The uploaded documents may be in one or a plurality of different data formats. Exemplary data formats include PDF and DOCX. The data in the first data group and the data in the second data group correspond to a common (financial) transaction. Each document is received by document uploader 200 as one or more files. If each document is received by document uploader 200 as a digital file, each digital file is passed to document image handler 300. If each document is received by document uploader as an image file, each image file is passed to document image handler 300 as an image file for image file to digital file conversion as explained below.

Typically, the second plurality of data values embedded in the plurality of documents are not associated (linked) with category identification in digital form. Category identification for each of the second plurality of data values is determined and associated with the second plurality of data values, respectively, as further described below.

Document uploader 200 optionally includes an OCR converter for converting the received file from image data to digital data. OCR conversion may be performed by software such as Filestack OCR, Cisdem PDF Converter OCR, Adobe Acrobat, ABBYY FineReader, etc.

Document image handler 300 receives the digital images, and removes numerical digits from the digital images, to obtain a modified form of the digital images, hereafter "modified content." This process may proceed by evaluating digital content of said digital images, enabling alphabet characters (A-Z, a-z, special characters, etc.) to remain in said digital images, while numerical characters (0-9) are omitted from said digital images to generate the modified content. In an exemplary embodiment of the present invention, numerical characters and special characters (#, $, %, !, etc.) may be omitted. Alphanumeric characters corresponding to calendar dates may also be omitted. Alphanumeric characters corresponding to preselected words may also be omitted. This additional processing step provides the technical advantage of enabling more accurate training of the language model as explained below. The modified content (e.g. without the numerical characters, without the numerical characters and special characters, etc.) is then transmitted to document recognition interface 350 described below.

Document recognition interface 350 provides a first machine learning engine 351 with the modified content. First machine learning engine may be a commercially available machine learning system. In an exemplary embodiment of the present invention, the first machine learning system receives the modified content, evaluates the modified content, and identifies a document type that corresponds to the digital image that was evaluated before the resulting modified content was formed.

The first machine learning engine 351 uses artificial intelligence to identify the document type that corresponds to the digital image before the modified content was formed. One of ordinary skill in the art is aware of various commercially available machine learning software resources that may be used as first machine learning engine 351. Examples include Microsoft Azure AI Document Intelligence, Bert Base Model Uncased, Docugami Document Engineering and Alphmoon. Document classification may also be implemented in Python. First machine learning system 351 undergoes machine learning training in order to identify document types. In a financial transaction, exemplary document types may include application, estimate, appraisal, deed, note, agreement, disclosure, etc. During the training procedure, first machine learning system 351 is provided with a plurality of different digital images (with digital numbers removed and/or digital numbers with other characters removed) and responds with the respective document type for each of those images. This process can be repeated multiple times for multiple types of documents. By providing first machine learning system 351 with multiple examples of documents (a plurality of each type of document) and providing first machine learning system 351 with the document type for each of the plurality of examples of documents, first machine learning system is trained to recognize document type for each document presented to first machine learning system 351 in the future.

As is known in the art, a machine learning system such as NLP builds a knowledge base by being trained as set forth above, and applying that knowledge base when it receives digital data for evaluation. Thus, the first machine learning system 351 uses a first knowledge base that is formed and enhanced therein, to recognize document type for each document presented to it. Exemplary commercially available machine learning software resources are set forth above.

Training occurs by gathering a large dataset of the different types of documents first machine learning system 351 will be expected to recognize in the future. For each type of document, a significant number of examples (at least 100-1000, or more) of each type of document is desirable. Each type of document may then be annotated with its corresponding type before being submitted for training first machine learning system 351. In some exemplary embodiments this may be done manually, while in other exemplary embodiments this may be done with a data annotation tool.

In an exemplary embodiment of the present invention, training of first machine learning engine 351 may be performed by document identification training interface 700.

Document identification training interface 700 trains first machine learning engine 351 to identify documents using for example, OCR data, document recognition of standard forms, or other methods such as identifying keywords or anchors on the first or last page. To enhance document recognition, industry-specific terms and abbreviations are added to the OCR word library. This approach improves accuracy compared to using generic OCR libraries, which may skip unrecognized words. For instance, in the mortgage industry, key terms might include MERS, FNMA, FRD, GSE, and MIN.

The above procedure describes training using "documents." Again, in an exemplary embodiment of the present invention, the documents are digital images that have been modified to omit numerical digits (and optionally special characters and/or other characters) that were included when the digital images were upload by document uploader 200.

Using Google AutoML Vision, for example, the (annotated) documents are imported into first machine learning system 351. The process of training first machine learning system 351 is then initiated, and after a time period (that can be extensive for a large dataset size), the performance of the resulting training model may be evaluated. This evaluation may be performed by using a validation set (a subset of data that was not used during training) to see how well the resulting training model generalizes to unseen data. Of course, if the model's performance is not satisfactory, it may be desirable to collect more data, adjust model parameters or try a different machine learning algorithm. Once the evaluation provides satisfactory results, the model is available for evaluating modified content.

By providing the first machine learning system 351 (using various programming languages) with an image of each modified content (after first machine learning system 351 has been trained), first machine learning system 351 responds with a) a document "type" for the document corresponding to the modified content; and b) the confidence score (i.e. a probability score indicating how confident the model is in its prediction of the document "type"). In some exemplary embodiments, first machine learning system 351 may respond with multiple predictions and the respective confidence score for each. For a prediction with a confidence score greater than a predetermined number (obtained, for example, by experimentation), a document type can be assigned to a document.

In the above scenario, it is possible that first machine learning system 351 will be presented with a document it does not recognize. In that situation, the document will be marked with a flag such as "unknown." Via for example the first user interface 1000 (described below), a user is informed that first machine learning system 351 was unable to identify the document. In one exemplary embodiment the document may then be manually identified. In another exemplary embodiment of the present invention, the document is again presented to first machine learning system 351, along with the document's type (identification), for retraining first machine learning system 351. The retraining may be related to a document type for which first machine learning system 351 has previously been trained, or a document type for which first machine learning system 351 has not been previously trained.

First machine learning system 351 may use models to identify different types of documents. For an example of using models to identify documents, see U.S. Pat. No.

11,809,454 which is hereby incorporated by reference in its entirety for its teachings regarding the use of models to perform document classification.

After document recognition interface 300 receives document identification from first machine learning system 351, processing may optionally proceed to data extraction preprocessor 400. The purpose of data extraction preprocessor 400 is to identify whether multiple versions of a single document were included in the digital images that were uploaded to document uploader 200. While most versions of a single document are typically not uploaded, in some situations it is possible for uploading of multiple versions of a document to occur. Data extraction preprocessor 400 may evaluate, for example, multiple copies of a promissory note; an initial draft version, a final draft version, and a signed version of a contract; a document with full vs. partial pages; recorded vs. unrecorded versions of a document; etc.

In an exemplary embodiment of the present invention, data extraction preprocessor 400 may use waterfall verification to select for further analysis a preferred version of a document that was uploaded with multiple versions. In an exemplary embodiment of the present invention, Natural language Processing (NLP) techniques may be used to identify key entities (names, dates, etc.), key sections (introduction, conclusion, etc.), metadata (version number, creation date, etc.) and other key elements. In an exemplary embodiment of the present invention, key sections may be identified using common headers, document segmentation, and/or semantic analysis.

In an exemplary embodiment of the present invention, the above analysis is performed for each uploaded version of a document. Furthermore, the analysis is performed for example using a layered verification approach in which each version is sequentially validated against a previous version. In this manner, the preferred version of a document can be identified. In an exemplary embodiment of the present invention, the preferred version may be the most recent version of a document, the signed version of a document, the version of a document not stamped "draft," etc.

After completing processing by document image handler 300 and optional data extraction preprocessor 400, each digital document is provided to data handler 500, along with the document type identified via first machine learning engine 351 and returned to document image handler 300 via document recognition interface 350.

Data handler 500 provides each document along with its respectively identified document type to data recognition interface 550. Data recognition interface 550 provides second machine learning engine 551 with access to the digital images (with its numerical digits and special characters included, i.e. not the modified content). If data extraction preprocessor 400 has been used, data recognition interface 500 provides second machine learning engine 351 with access to the preferred version of a document included in said digital images (and from which embedded data will be extracted). Second machine learning engine 551 extracts both numerical digital values (e.g. prices) and alphanumeric digital values (e.g. addresses) and identifies respective categories for each of the extracted numerical digit values and alphanumeric digital values.

Second machine learning engine 551 may be a commercially available machine learning system (e.g. Parseur, Nanonets, Brightdata, etc.) that uses artificial intelligence to identify categories of (digital/alphanumeric) values that were extracted from each type of document. Exemplary machine learning systems are known in the art.

Prior to being used for category identification, second machine learning system 551 undergoes machine learning training in order to identify categories of data values embedded in each document type. In an exemplary embodiment of the present invention, training of second machine learning system 551 may be performed by data identification training interface 800.

Data identification training interface 800 may use a web-based UI such as first user interface 1000, allowing users to click on words and their locations within a document. The data fields are predefined according to the requirements of a specific industry application. Initially, the UI is configured to employ a specific technique for data extraction based on the document type. These techniques include regular expressions, table extraction, standard form recognition, natural language processing (NLP), and computer vision for image graphics.

During the training procedure, second machine learning system 551 is provided with multiple examples of each type of document, and is provided with categories for embedded data values that are included in each type of document. This process can be repeated multiple times for each type of document. By providing second machine learning system 551 with multiple examples of each type of document in combination with the categories of embedded data values in each example (including for example information regarding where in the each type of document each of the embedded values are located), second machine learning system is trained to recognize categories of embedded data values when a document of each document type is provided to second machine learning system 551 in the future.

Training of second machine learning system 551 occurs by gathering a large dataset of the different types of documents the software will be expected to analyze in order to categorize data values embedded therein. For each document type, a significant number of examples (at least 100-1000 or more) of each document type (along with categories of embedded data therein) is desirable.

In an exemplary embodiment of the present invention, training of second machine learning engine 551 may be performed by data identification training interface 800.

By providing second machine learning system 551 (using various programming languages) with each of the digital documents that were uploaded and each document type that was identified by document recognition interface 300, second machine learning system 551 responds to data recognition interface 550 with a) the predicted categories of numerical values and alphanumeric values embedded in the document; and b) the confidence score (i.e. a probability score indicating how confident the model is in its prediction). In some exemplary embodiments, second machine learning system 351 may respond with multiple predictions and the respective confidence score for each. For a prediction with a confidence score greater than a predetermined number (obtained, for example, by experimentation—an example would be a 95% confidence score), a category type can be assigned to numerical digits and alphanumeric values included in each document.

Second machine learning system 551 may use a model. An exemplary formation and use of a model may be found in U.S. Pat. No. 11,769,341 which is incorporated by reference in its entirety herein for its teachings regarding the extraction of structured data from unstructured documents. U.S. Pat. No. 9,424,524 is also incorporated herein for its teaching regarding extracting facts from unstructured text. Second machine learning system 551 may also be available through Python.

Again, as is known in the art, a machine learning system such as NLP builds a knowledge base by being trained as set forth above, and applying that knowledge base when it receives digital data for evaluation. Thus, the second machine learning system 551 uses a second knowledge base that is formed and enhanced therein, to perform category identification and data extraction for each document presented to it.

After a category type has been assigned to each numerical digit value and alphanumeric value that has been extracted from each document, the results of these assignments are provided to rules engine 600. Rules engine 600 then applies rules and/or comparisons to the extracted values to determine if values have been extracted correctly from each document and/or to determine if category types have been identified correctly for each extracted value. The application of rules and/or comparisons can take several forms. What follows are several exemplary rules/comparisons:

compare numerical digit values in two different documents that should be the same;

compare alphanumeric values in two different documents that should be the same;

perform a calculation of numerical digital values that appears in one document, and compare with numerical digit value in that one document that should equal the calculation;

perform a calculation of numerical digit values that appears in one document, and compare with a numerical digital value in another document that should equal the calculation;

perform a calculation of numerical digit values that appears in one document; perform a further calculation of numerical digital values that appears in another document, and compare the two calculations that should be equal.

review a numerical digit value in one document, and determine that the numerical digit value is erroneous (e.g. a numerical digit value greater than "12" that was intended to correspond to a calendar month.

First user interface 1000 enables user review of evaluations performed by first machine learning engine 351, second machine learning engine 551, and rules engine 600. Results of first machine learning engine 351, second machine learning engine 551, and applying rules and/or performing comparisons by rules engine 600 are provided to a first user via first user interface 1000 for feedback and/or correction. First user interface also provides comparisons with the data that was uploaded by data uploader 100. Exemplary comparisons include:

comparing data uploaded by data uploader 100 with document identification obtained from document recognition interface 300;

comparing data uploaded by data uploader 100 with data extracted (via data type) from one or more documents and obtained from data recognition interface 500;

comparing data uploaded by data uploader 100 with results of comparisons and/or application of rules by rules engine 600;

comparing identification/categorization of data type for data uploaded by data uploader 100 with identification/categorization of data extracted and provided by data recognition interface 500;

comparing identification/categorization of data type for data uploaded by data uploader 100 with identification/categorization of data obtained through calculations applied to data extracted and provided by data recognition interface.

First user interface 1000 may provide an ability to view the comparisons set forth above, and the ability to correct data and/or data categorization and/or document identification. If, for example, data has been incorrectly identified/ categorized, first user interface 1000 may provide an option to correct the identification/categorization of the data. If, for example, a document that was uploaded via document uploader 200 was incorrectly identified, first user interface 1000 may provide an option to correct the identification/ categorization of the document. If, for example, embedded data was incorrectly extracted from a document uploaded via document uploader 200, the incorrect extraction can be corrected.

FIG. 4A is a simulated screenshot that may be available via first user interface 1000. In this exemplary screenshot, data that was uploaded via the "tape" and data that was extracted from documents via second machine learning engine 551 are visualized so the respective data from each source can be (visually and/or otherwise) compared. As shown, some data values are the same in the tape upload and the extraction performed by second machine learning engine 551, while other data values differ. For example, the principal amount is equal in both sources, however the FHA case #does not match (it is incomplete in the data extraction by second machine learning engine 551 from the Note). Also, the Expected Interest Rate does not match between the Tape and Note. In both situations, a user of first user interface 1000 can correct the errors.

In one exemplary embodiment of the present invention, upon correcting the errors (if due to an erroneous extraction of data values), second machine learning engine 551 may automatically be retrained with the corrected data value via data identification training interface 800.

In another exemplary embodiment of the present invention, upon correcting the errors (if due to an erroneous extraction of data values), second machine learning engine 551 may be retrained responsive to manual input for a user. The manual input may be, for example, entered via first user interface 1000.

FIG. 4B is a simulated screen shot of a further screen that may be available via first user interface 1000. As shown in FIG. 4B, for each evaluated document, the data value retrieved from each document may be displayed along with the category identified for each retrieved data value. For example, for document ALLONGE, data value 538500.00 has been retrieved an has been identified as corresponding to data category allonge_note_amount. The data values for other documents are available on this screen, and may be hidden from view until a user desires to see that information.

FIG. 4C is a simulated screen shot of a further screen that may be available via first user interface 1000. As shown in FIG. 4C, references to each uploaded document associated with a transaction, and references to the data values associated with each uploaded document are displayed. This screen enables a user to select a document or a data value that is to be retrained (via first machine learning engine 351 or second machine learning engine 551). FIG. 4C also illustrates that the document subject to (re) training may be displayed, so that highlighting a particular field in that document highlights the reference to the data value occupying that particular field. In the example, the selected document includes field 263-282. Highlighting a field within the document results in selecting the corresponding reference. Then clicking on the reference, for example, may result in retraining for the corresponding field.

In one exemplary embodiment, if all (or many) categories for data values retrieved from a document are incorrect, this may indicate that the document was incorrectly identified before data retrieval and categorization occurred. In that situation, retraining in order to correctly identify a document via first machine learning engine 351 may be requested.

After data has been compared via first user interface 1000, and/or document identification has been reviewed via first user interface 1000, the data that was subject to comparison, the identification of documents that was previously determined, the identification of data that was previously determined, and/or any corrections/annotations that were performed via first user interface 1000 are provided to one, some or all of four destinations: report generator 1100, document identification training interface 700, numerical digit identification interface 800, and second user interface 1200. Each destination will be discussed separately.

Report generator 1100 can receive some or all of the information that was received by first user interface 1000. Report generator 1100 can also receive some or all of the feedback/edits that a user entered into first user interface 1000. Report generator can then organize, modify, and/or display what it receives in the form of various reports. Exemplary reports that can be generated by report generator 1100 may include custom reports with pre-defined data sets, exceptions, some or all of the extracted data, bookmarked documents (uploaded by document uploader 200 or omitted from being uploaded by document uploader 200), industry reports, reports on users that have viewed and/or edited data, time periods such as time periods between document uploads and interaction with first user interface 1000, etc. Reports may be formed and customized using commercially available software resources, including outlook, tableau, etc. Report generator 1100 may be web based, for example.

Second user interface 1200 may enable a second user to review results that are the same or different than the results a first user may review/edit via first user interface 1000. For example, the first user may be a professional employee of a business entity that is processing a transaction associated with the evaluated documents (for example a bank employee), and the second user may be a customer of the business entity that has contracted with the business entity to perform the transaction (for example a customer that has applied for a loan). The second user interface 1200 may also provide information regarding the progress of a document review. Other optional functions available via the second user interface include: rejecting findings of the first user that were entered via first user interface 1000, waiving said findings, uploading a new document responsive to an exception identified via the first user interface 1000, etc. After a new document is uploaded responsive to upload initiation via second user interface 1200, evaluation may be repeated (starting for example with document recognition interface 300).

While document identification training interface 700 may be used for training first machine learning engine 351 as described above, document identification training interface 700 may be used for retraining first machine learning engine 351 as well.

Documents that are not recognized are categorized as "Unknown" and require user intervention to classify them correctly. The user intervention can occur, for example, vis first user interface 1000. This user feedback is then incorporated into subsequent versions of the document recognition model within first machine learning engine 351. First machine learning engine 351 learns to distinguish between different document types by analyzing multiple versions of the same document, identifying both common elements and differences. These common elements are desirable for accurate document type identification.

Once the new document category is identified through the review of the user feedback, or if an unknown document type is pre-identified by the client, due for example to a new government form or document type, first machine learning engine 351 is trained to recognize the new document type.

The training of first machine learning engine 351 may desirably be conducted as a standalone process. This ensures that each new version of the model is updated and better trained, resulting in continuous improvement in document recognition capabilities.

Data identification training interface 800, while described above as being used for training in an exemplary embodiment of the present invention, can also be used for retraining following display of comparison results via first user interface 1000.

If a user corrects data inaccurately extracted via second machine learning engine 551, both the original and corrected data values are submitted through first user interface 1000 for review. This feedback is used to retrain the second machine learning engine 551 for the specific document type in which the data was inaccurately extracted.

If the data field was incorrectly extracted, not fully extracted, or did not extract at all, the feedback from user via first user interface 1000 will have correction data as well as data originally extracted and the software will report on the mismatch of the data extraction vs human data correction. The different known technology methods can be used for data extraction from known documents, such as NLP (natural language processing), Regular Expressions (RegEx), Standard Forms, Data Tables, Computer vision, Geographical data extraction through coordinate on the page, just to name a few.

Reviewers and trainers work with the second natural language engine 551, mapping correct data values from each document in the pre-loaded variety. This process involves showing the tool all the locations of data fields that need to be extracted. The coordinates of the extracted fields are then passed to first user interface 1000, ensuring precise identification of data origins during the extraction process.

Figure 3A:
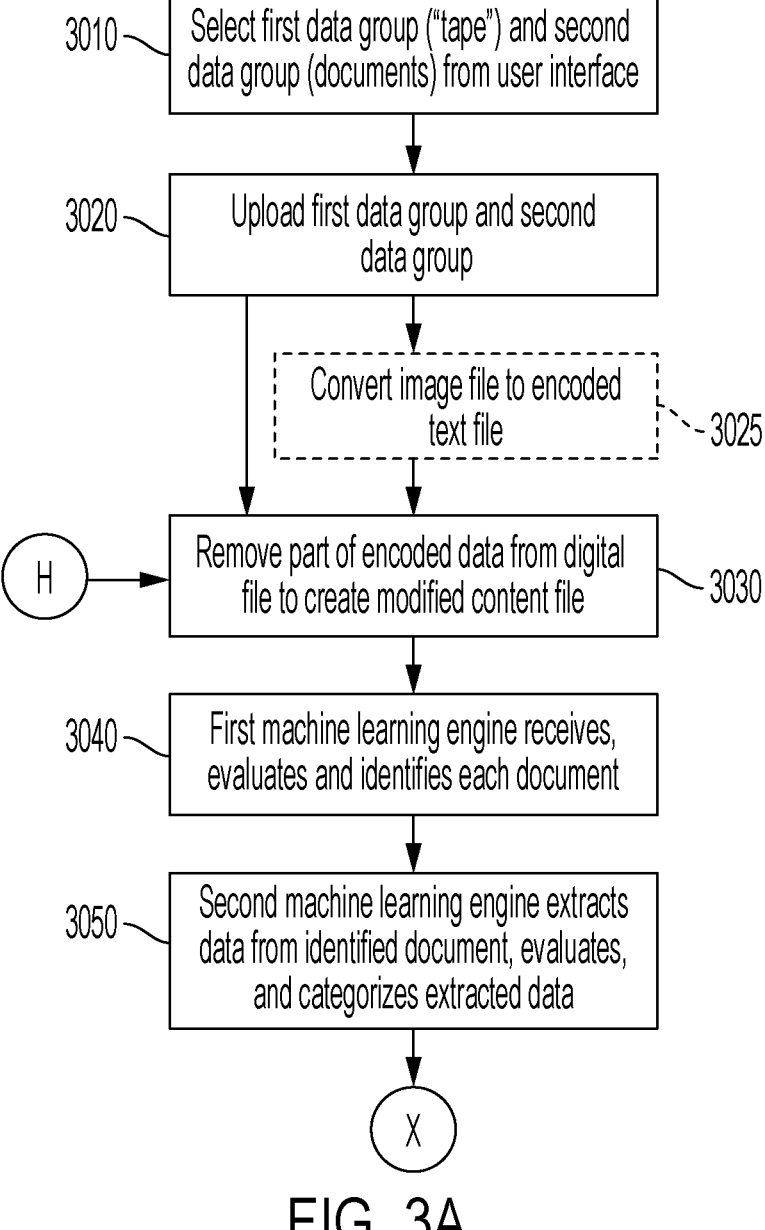
FIG. 3A and FIG. 3B are respective parts of a flow chart diagram that illustrates a method for reviewing data objects that are documents in accordance with an exemplary embodiment of the present invention.
Figure 3B:
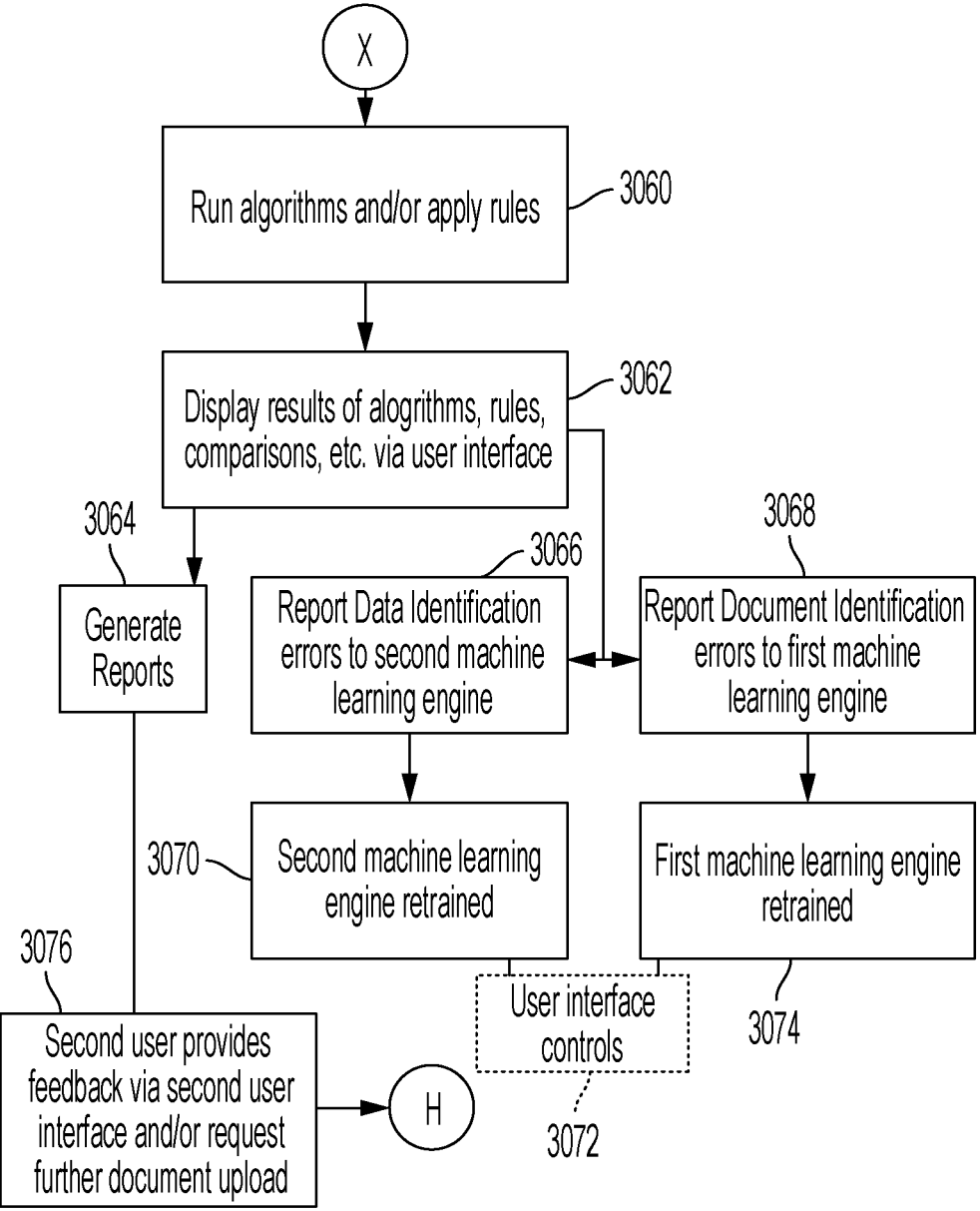

FIG. 3A and FIG. 3B are respective parts of a flow chart diagram that illustrates a method for evaluating data in accordance with an exemplary embodiment of the present invention.

At step 3010, a user interface associated with data uploader 100 may be used to select a preconfigured template that will be used for evaluation of uploaded documents. Furthermore, the user interface associated with data uploader 100 may be used to upload the first data group and the second data group. The first data group may include one or more data files (sometimes referred to as "the tape") that contain data associated with a financial transaction. In the first data group, relevant data has been stored in a data structure using a variety of methods, including manual entry, form assisted entry, etc. Data in the first data group may be stored in a variety of different data structures, such as an excel file (for example). The user interface associated with data uploader 100 may also be used to upload the second data group. The second data group may consist of documents associated with the financial transaction being evaluated.

Step 3010 thus includes the step of selecting the first data group and the second data group for upload, and then for initiating the uploads.

Step 3010 may also include the step of enabling selection of a template through which data included in the first data group is viewed (although in some embodiments, template selection may be auto-detected).

At step 3020, responsive to the initiations in step 3010, the first data group and the second data group are uploaded.

At optional step 3025 the second data group was uploaded in the form of an image file. By stating "image file" what is meant is a file obtained for example from a scanned document. At optional step 3025, OCR is performed to convert the image file into a digital file of machine encoded text (i.e. recognized text extracted from an image). The pre-OCR file is sometimes referred to as an image based PDF. The post-OCR file is sometimes referred to as a searchable PDF and/or an editable PDF. In other words, if the second data group were uploaded at step 3020 with machine encoded text, then step 3025 is unnecessary. However, if the second data group were uploaded at step 3020 as an image file, then step 3025 is performed to generate a file with machine encoded text.

For the following description, a file with encoded text will be referred to as a digital file. If the documents that comprise the second data group include encoded text, then step 3025 may be unnecessary.

At step 3030, converted digital image handler 300 receives the digital file and removes part of the encoded data. In particular, encoded data that is numerical digits is removed from the digital file (although other encoded data, such as calendar date data and/or special characters, may be removed as well). The resulting file with numerical digits removed will be referred to as a modified content file. The modified content file will be subject to evaluation by first machine learning engine 351.

At 3040, in an exemplary embodiment of the present invention, first machine learning engine 351 receives and evaluates each document that is provided as a modified content file, and then identifies each document. By providing each document to first machine learning engine 351 as a modified content file (instead of as a digital file with numerical digits included), first machine learning engine 351 is able to identify each document with great accuracy. As a result of this technological improvement, accuracy regarding document identification is increased, few errors occur, and less retraining of first machine learning engine 351 is needed, thus achieving greater computing efficiency and better use of resources.

First machine learning engine 351 implements natural language processing (NLP) or other forms of modeling, and commercial versions of NLP are available (examples provided above) and can be trained and used as is known to a person of ordinary skill in the art having reviewed the present disclosure.

At step 3040, in a further exemplary embodiment of the present invention, first machine learning engine 351 provides an identification of each document and also provides a probability that its identification is correct. For each probability greater than an accepted value (for example, a 95% probability the document has been identified correctly), the identification is accepted and is assigned to the respective document.

At step 3050, based on the document identification that occurs at step 3040, data recognition interface 500 provides each document (or access thereof) to second machine learning engine 551 in order to extract data embedded therein. To be clear, what is provided to (or given access to) second machine learning engine 551 is the digital file with the numerical digits included for each document (i.e. the characters removed at step 3030 are now included), as well as the document identification that occurred at step 3040. Based on the (access to the) digital file and the identification of the document that was performed at step 3040, second machine learning engine 551 extracts from the digital file a plurality of numerical data values, as well as (optionally) alphanumeric data value(s). An example of numerical data may be a total price. An example of alphanumeric data may be a street address. In addition to extracting numerical data and alphanumeric data, each numerical data and alphanumeric data value is identified/categorized. For example, in the aforementioned example, extracted numerical data value may be identified as "total price" and extracted alphanumeric data value may be identified as "street address."

At step 3060, the extracted numerical (and/or alphanumerical data) is evaluated for correctness. This may be accomplished for example by executing one or more algorithms on the extracted data. An example of an algorithm is an algorithm that adds dollar values of line items and compares the total to a "total price" that was extracted from a document. Another example of an algorithm is an algorithm that compares two alphanumeric values that have the same identification (e.g. "street address") but that are located in two different documents. Another method for evaluating extracted data for correctness is to compare extracted data with data that was obtained from the first data group, and for flagging inconsistencies. Another example of an algorithm is to apply rules to the extracted data and to confirm that the extracted data satisfies the applied rules.

At step 3062 the results of the algorithms, rules and comparisons described at step 3060 are displayed in a user interface, for example first user interface 1000. The display of results may occur based on the template that was selected in step 3010.

At step 3064 reports may be generated based on the algorithms, rules and comparisons that were performed at step 3060, and/or based on the data that was extracted at step 3050, and/or based on that data that was obtained from the first data group, and/or based on other data. Other data can include data associated with the transaction being evaluated and/or data external to the data being evaluated, such as market conditions.

Processing may proceed from step 3064 to step 3076 in which a second user is able to provide feedback via a second user interface (e.g. second user interface 1200). As previously explained, the second user may be given several options, including the ability to upload missing documents, view errors, reject findings, accept findings, receive status reports, etc. Processing may then proceed to step 3030 via offpage connector H.

After completing step 3062, processing may proceed to steps 3066 and/or 3068 (in no particular order or at the same time). At step 3068, informalities (e.g. errors) relating to document identification may be reported to first machine learning engine 351 via document identification training interface 700 for retraining. Following step 3068, processing may proceed to step 3074 in which the first machine learning engine is retrained. At step 3066, informalities relating to data extraction and/or identification may be reported to second machine learning engine via data identification training interface 800 for retraining. Following step 3066, processing may proceed to step 3070 in which the second machine learning engine is retrained.

At optional step 3072 a user interface may be used to control retraining of either machine learning engine.

After retraining, all steps may be performed with retrained models on a new set of a first plurality of data values and second plurality of data values (i.e. associated with a new/ different transaction). By using retrained models, errors during future processing should be reduced.

Figure 5:
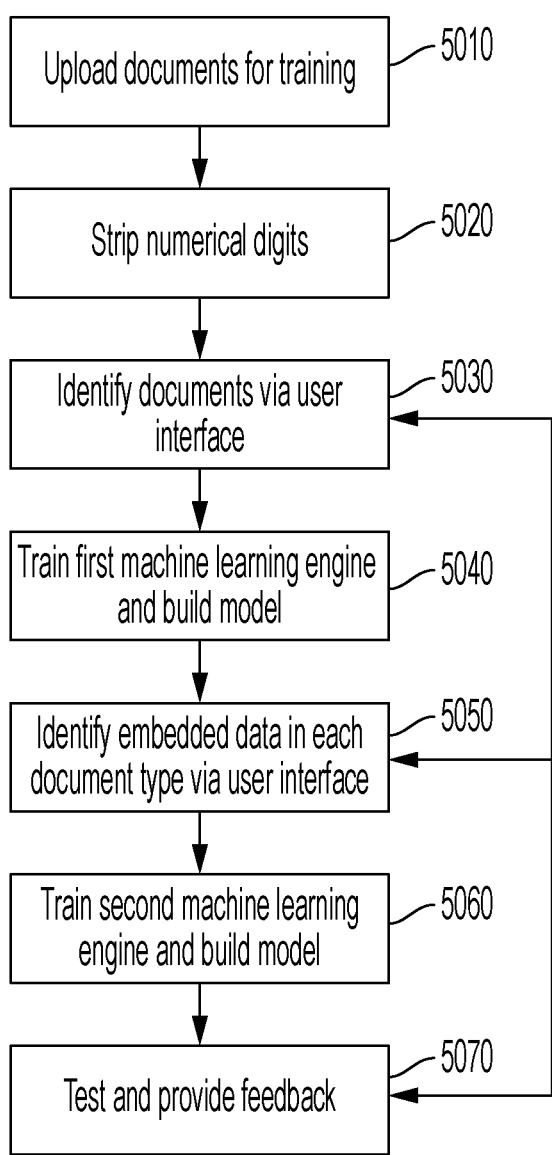
FIG. 5 is a flow chart diagram of model training of multiple natural language models in accordance with an exemplary embodiment of the present invention.

Initial training is illustrated in the flow chart diagram that appears in FIG. 5. The training illustrated in this figure is merely exemplary.

At step 5010, a plurality of documents are uploaded for training.

At step 5020, numerical (and/or alphanumerical) digits are stripped from the documents for training.

At step 5030, uploaded documents are identified according to document type. This may done via a user interface. The previously described NLP may also be used to provide a "guess" regarding document identification, subject to user review and confirmation. Other forms of data modeling may also be used.

At step 5040, the first machine learning engine is trained and a respective NLP model (or other model) is built for the purpose of future document type identification by the NLP.

At step 5050, embedded text is categorized/identified in each uploaded document that is identified by document type. This may be done via a user interface. Again, NLP or other modeling may be used to take an initial "guess" subject to user review and confirmation.

At step 5060 the second machine learning engine is trained, and a further respective NLP model or other model is built for the purpose of future embedded text categorization/identification.

At step 5070, each model is tested (with, for example, test documents that were not part of the initial document upload) and a user may provide feedback of the test results. Feedback may include adding the results of the tested test documents to either or both models. Processing may then proceed to step 5030 and/or step 5050 for further refinement of each model.

After both machine learning engines have been trained, processing may proceed to the flowchart that appears in FIG. 3A and FIG. 3B. Through the steps that appear in FIG. 3A and FIG. 3B, the models that are created in the steps that appear in FIG. 5 may be further refined and improved. Also, the bifurcation of training (e.g. training the first machine learning engine and the second machine learning engine independently) enables each model to be built with a greater ability to provide accurate results. Thus technical advantages are achieved over use of a single model, as greater accuracy is obtained, and resource utilization is optimized.

The training illustrated in FIG. 5 may be repeated at any time if increase in accuracy of either or both models is desired.

In the above exemplary embodiments, data extraction is included before documents are submitted to the first machine learning engine (to achieve the technical advantage of reducing "noise" and building a model capable of identifying documents with greater accuracy) and data extraction is included while embedded data is evaluated by the second machine learning engine. In some exemplary embodiments, the two data extractions may be combined into common data extraction steps.

While flowcharts have been referred to herein showing particular orders of performing steps, it is understood that the orders are exemplary and may vary as desirable in order to provide data object evaluation, correction of evaluated data values, and confirmation of correct data value receipt.

While exemplary embodiments of the present invention have been described herein, it is understood that aspects of one exemplary embodiment may be combined with aspects of another exemplary embodiment as desirable in order to provide data object evaluation, correction of evaluated data values, and confirmation of correct data value receipt.

In an exemplary embodiment of the present invention, a computer system may be included and/or operated within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a smart watch, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system includes a processing device, a main memory (e.g., read-only memory (ROM), flash memory, dynamic random access memory (DRAM) (such as synchronous DRAM (SDRAM) or Rambus DRAM (RDRAM), etc.), a static memory (e.g., flash memory, static random access memory (SRAM), etc.), and a data storage device, which communicate with each other via a bus.

Processing device represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device may also be one or more special-purpose processing devices such as an application specific integrated circuit (ASIC), a field programmable gate array (FPGA), a digital signal processor (DSP), network processor, or the like. Processing device is configured to execute listings manager logic for performing the operations and steps discussed herein.

Computer system may further include a network interface device. Computer system also may include a video display unit (e.g., a liquid crystal display (LCD) or a cathode ray tube (CRT)), an alphanumeric input device (e.g., a keyboard), a cursor control device (e.g., a mouse), and a signal generation device (e.g., a speaker).

Data storage device may include a machine-readable storage medium (or more specifically a computer-readable storage medium) having one or more sets of instructions (e.g., reference generation module) embodying any one or more of the methodologies of functions described herein. Aspects of the exemplary embodiments described herein may also reside, completely or at least partially, within main memory and/or within processing device during execution thereof by computer system; main memory and processing device also constituting machine-readable storage media. Aspects of the exemplary embodiments described herein may further be transmitted or received over a network via network interface device.

Machine-readable storage medium may also be used to store aspects of exemplary embodiments of the present invention. While a non-transitory machine-readable storage medium is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the aforementioned description, numerous details are set forth. It will be apparent, however, to one skilled in the art, that the disclosure may be practiced without these specific details. In some instances, well-known structures and devices are shown in block diagram form, rather than in detail, in order to avoid obscuring the disclosure.

The disclosure is related to an apparatus for performing the operations herein. This apparatus may be specially constructed for the required purposes or it may comprise a general purpose computing device selectively activated or reconfigured by a computer program stored therein. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMS, EEPROMs, magnetic or optical cards, flash memory devices including universal serial bus (USB) storage devices (e.g., USB key devices) or any type of media suitable for storing electronic instructions, each of which may be coupled to a computer system bus.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

The invention claimed is:

1. A system for processing a plurality of documents associated with a transaction, comprising:

a data uploader for uploading a first plurality of data values associated with said transaction;

a document uploader for uploading digital images of a plurality of documents associated with said transaction, wherein said plurality of documents include a second plurality of data values embedded therein;

a converted digital image handler for providing modified content of said digital images in which said second plurality of data values that are numerical digit values and that were embedded in said plurality of documents are omitted;

a document recognition interface for providing access to said modified content, and responsive to said access, receiving from a first machine learning engine, document identification of said plurality of documents;

a data recognition interface for providing access to said digital images with said second plurality of data values to a second machine learning engine, and after providing said access, receiving from said second machine learning engine, extraction of said second plurality of data values from said digital images along with category identification of respective document categories for each of said second plurality of data values that are extracted from said digital images;

a first user interface for enabling comparison and confirmation of accuracy of said first plurality of data values and said second plurality of data values by displaying said first plurality of data values with said second plurality of data values as being associated with each other, respectively, based on said category identification, and enabling correction if based on said displaying, association between any of said first plurality of data values and said second plurality of data values is missing or incorrect;

a document identification engine training interface for providing feedback regarding correctness of said document identification based on said displaying to said first machine learning engine, for retraining said first machine learning engine to increase accuracy of said document identification of said documents;

a numerical digit identification interface for providing feedback regarding correctness of extraction of said second plurality of data values from said digital images or said category identification to said second machine learning engine for retraining said second machine learning engine to increase accuracy of said extraction or said category identification.

2. A system according to claim 1, further comprising an OCR interface in which said digital images are transitioned from image data to digital data before being provided to said digital image loader for providing said modified content.

3. A system according to claim 1, wherein said data uploader allows selection of a preconfigured template in which at least one of said first plurality of data values and said second plurality of data values are organized.

4. A system according to claim 1, wherein said data uploader allows selection of said plurality of documents, and said document uploader uploads said digital images based on said selection.

5. A system according to claim 1, wherein said plurality of documents are associated with a banking or financial transaction.

6. A system according to claim 1, wherein if said first machine learning engine does not provide document identification of at least one type of said documents, said user interface is adapted to receive said document identification of said one type of said documents, and said document identification is provided to said first machine learning engine for associating said document identification with said one type of said documents at a future time in order to improve accuracy of said document identification.

7. A system according to claim 1, wherein if said second machine learning engine does not provide said category identification or said extraction of at least one of said second plurality of data values in one of said digital images, said user interface receives said category identification of said one of said second plurality of data values, and said category identification is provided to said second machine learning engine for associating said category identification with said one of said second plurality of data values at a further future time.

8. A system according to claim 1, wherein said document identification engine training interface instructs said first machine learning engine to modify its first knowledge base for identifying said document identification of said documents based on said digital images, and said data recognition interface instructs said second machine learning engine to modify its second knowledge base for identifying said respective document categories of said second plurality of data values.

9. A system according to claim 1, further comprising a comparator for comparing said first plurality of data values uploaded by said data uploader with said second plurality of data values after said category identification for said second plurality of data values have been determined by said second machine learning engine, and providing comparison results of said comparing to said first user interface, wherein said comparison results are used to determine said accuracy.

10. A system according to claim 1, wherein said first user interface also receives corrections to said document identification and said respective document categories of said second plurality of data values that have been extracted from said digital images, said system further comprises a second user interface for reviewing and providing further feedback regarding at least one of said documents or contents thereof after said comparison and confirming accuracy is received via said first user interface.

11. A method for processing a plurality of documents associated with a transaction, said method comprising the steps of:

uploading a first plurality of data values associated with said transaction;

uploading digital images of a plurality of documents associated with said transaction, wherein said plurality of documents include a second plurality of data values embedded therein;

providing modified content of said digital images in which said second plurality of data values that are numerical digit values and that were embedded in said plurality of documents are omitted;

providing access to said modified content, and responsive to said access, receiving from a first machine learning engine, document identification of said plurality of documents;

providing access to said digital images with said second plurality of data values to a second machine learning engine, and after providing said access, receiving from said second machine learning engine, extraction of said second plurality of data values from said digital images along with category identification of respective document categories for each of said second plurality of data values that are extracted from said digital images;

enabling comparison and confirming accuracy of said first plurality of data values and said second plurality of data values by displaying said first plurality of data values with said second plurality of data values as being associated with each other, respectively, based on said category identification, and enabling correction if based on said displaying, association between any of said first plurality of data values and said second plurality of data values is missing or incorrect;

providing feedback regarding correctness of said document identification based on said displaying to said first machine learning engine, for retraining said first machine learning engine to increase accuracy of said document identification of said documents;

providing feedback regarding correctness of extraction of said second plurality of data values from said digital images or said category identification to said second machine learning engine for retraining said second machine learning engine to increase accuracy of said extraction or said category identification.

12. A method according to claim 11, wherein said digital images are transitioned from image data to digital data using OCR before being provided to said digital image loader for providing said modified content.

13. A method according to claim 11, further comprising the step of allowing selection of a preconfigured template in which at least one of said first plurality of data values and said second plurality of data values are organized.

14. A method according to claim 11, further comprising the step of allowing selection of said plurality of documents, and said document uploader uploads said digital images based on said selection.

15. A method according to claim 11, wherein if document identification of at least one type of said documents does not occur, said document identification of said one type of said documents is received via a user interface, and said document identification is provided to said first machine learning engine for associating said document identification with said one type of said documents at a future time in order to improve accuracy of said document identification.

16. A method according to claim 11, wherein if said second machine learning engine does not provide said category identification or said extraction of at least one of said second plurality of data values in one of said digital images, said category identification of said one of said second plurality of data values is received via a user interface, and said category identification is provided to said second machine learning engine for associating said category identification with said one of said second plurality of data values at a further future time.

17. A method according to claim 11, wherein said first machine learning engine is instructed to modify its first knowledge base for identifying said document identification of said documents based on said digital images, and said second machine learning engine to modify its second knowledge base for identifying said respective document categories of said second plurality of data values.

18. A non-transitory computer readable medium having stored thereon instructions for operating a document evaluation system, the instructions when executed by at least one processor cause said at least one processor to implement the steps of:

uploading a first plurality of data values associated with said transaction;

uploading digital images of a plurality of documents associated with said transaction, wherein said plurality of documents include a second plurality of data values embedded therein;

providing modified content of said digital images in which said second plurality of data values that are numerical digit values and that were embedded in said plurality of documents are omitted;

providing access to said modified content, and responsive to said access, receiving from a first machine learning engine, document identification of said plurality of documents;

providing access to said digital images with said second plurality of data values to a second machine learning engine, and after providing said access, receiving from said second machine learning engine, extraction of said second plurality of data values from said digital images along with category identification of respective document categories for each of said second plurality of data values that are extracted from said digital images;

enabling comparison and confirmation of accuracy of said first plurality of data values and said second plurality of data values by displaying said first plurality of data values with said second plurality of data values as being associated with each other, respectively, based on said category identification, and enabling correction if based on said displaying, association between any of said first plurality of data values and said second plurality of data values is missing or incorrect;

providing feedback regarding correctness of said document identification based on said displaying to said first machine learning engine, for retraining said first machine learning engine to increase accuracy of said document identification of said documents;

providing feedback regarding correctness of extraction of said second plurality of data values from said digital images or said category identification to said second machine learning engine for retraining said second machine learning engine to increase accuracy of said extraction or said category identification.

19. A non-transitory computer readable medium according to claim 18, wherein if said second machine learning engine does not provide said category identification or said extraction of at least one of said second plurality of data values in one of said digital images, said category identification of said one of said second plurality of data values is received via a user interface, and said category identification is provided to said second machine learning engine for associating said category identification with said one of said second plurality of data values at a further future time.

20. A non-transitory computer readable medium according to claim 18, wherein said first machine learning engine is instructed to modify its first knowledge base for identifying said document identification of said documents based on said digital images, and said second machine learning engine 800 to modify its second knowledge base for identifying said respective document categories of said second plurality of data values.

* * * * *